(12) United States Patent
Sugata

(10) Patent No.: US 11,375,074 B2
(45) Date of Patent: Jun. 28, 2022

(54) IMAGE FORMING APPARATUS FOR FORMING AN IMAGE FOR MEASURING A RELATIVE POSITION WITH RESPECT TO A PAPER

(71) Applicant: FUJIFILM Business Innovation Corp., Tokyo (JP)

(72) Inventor: Tomokazu Sugata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/334,814

(22) Filed: May 31, 2021

(65) Prior Publication Data

US 2022/0174164 A1 Jun. 2, 2022

(30) Foreign Application Priority Data

Dec. 2, 2020 (JP) .............................. JP2020-199946

(51) Int. Cl.
*H04N 1/00* (2006.01)

(52) U.S. Cl.
CPC ....... *H04N 1/00761* (2013.01); *H04N 1/0066* (2013.01); *H04N 1/00702* (2013.01)

(58) Field of Classification Search
None
See application file for complete search history.

(56) References Cited

U.S. PATENT DOCUMENTS

| 9,025,217 | B2 | 5/2015 | Tanigawa et al. | |
|---|---|---|---|---|
| 2007/0103735 | A1* | 5/2007 | Ikeno | H04N 1/00753 358/449 |
| 2014/0022609 | A1* | 1/2014 | Tanigawa | H04N 1/047 358/488 |

FOREIGN PATENT DOCUMENTS

| JP | 2014022919 | 2/2014 |
|---|---|---|
| JP | 5974699 | 8/2016 |

* cited by examiner

*Primary Examiner* — Andrew H Lam
(74) *Attorney, Agent, or Firm* — JCIPRNET

(57) ABSTRACT

An image forming apparatus includes a mounting table on which an object whose image is to be scanned is mounted; an image forming section that forms an image, which includes a first image for measuring a relative position with respect to an end portion of a paper, on a first side of the paper; an image scanning section that scans the image mounted on the mounting table; and a position correction section that corrects a relative position of an image, which is formed on the paper, with respect to the paper based on a result of scanning performed by the image scanning section, in which in a case where the image scanning section scans the end portion of the paper and the image formed on the first side of the paper in a state in which the first side of the paper on which the first image is formed faces the mounting table, the end portion of the paper is mounted on the mounting table at a position separated from an end portion of the mounting table, and, further, the paper is covered with a cover paper, and the image forming section forms, on the first side of the paper, a third image that uses, as an alignment object, a second image for alignment formed on a side of the cover paper opposite to a side on which the cover paper is in contact with the paper while a part of the paper is mounted in a state of protruding from the mounting table and a first edge of the cover paper.

20 Claims, 8 Drawing Sheets

FIG. 3A
FIG. 3B
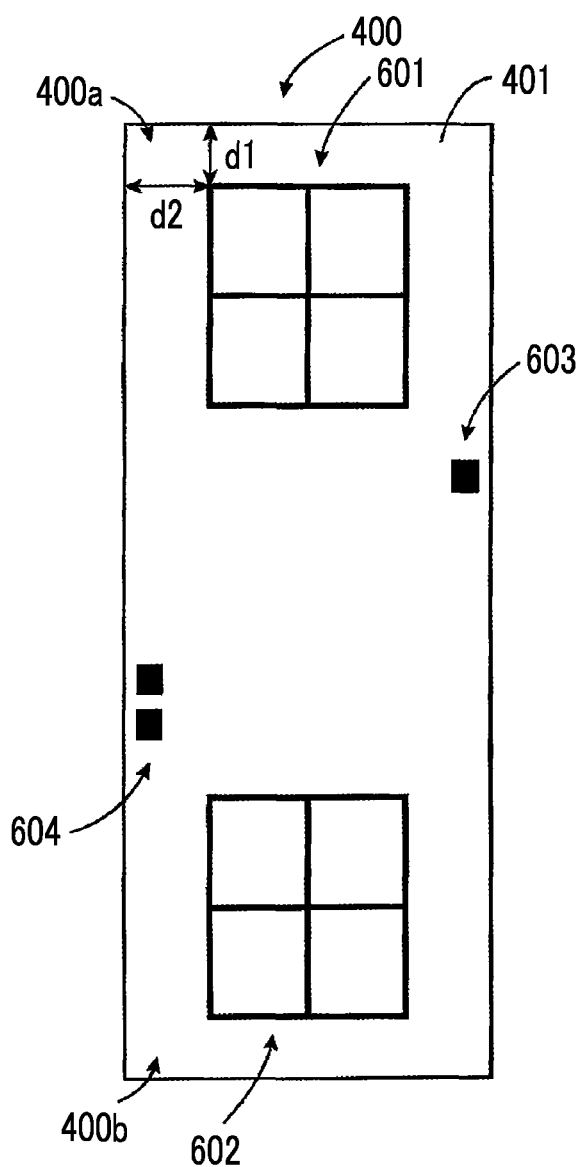
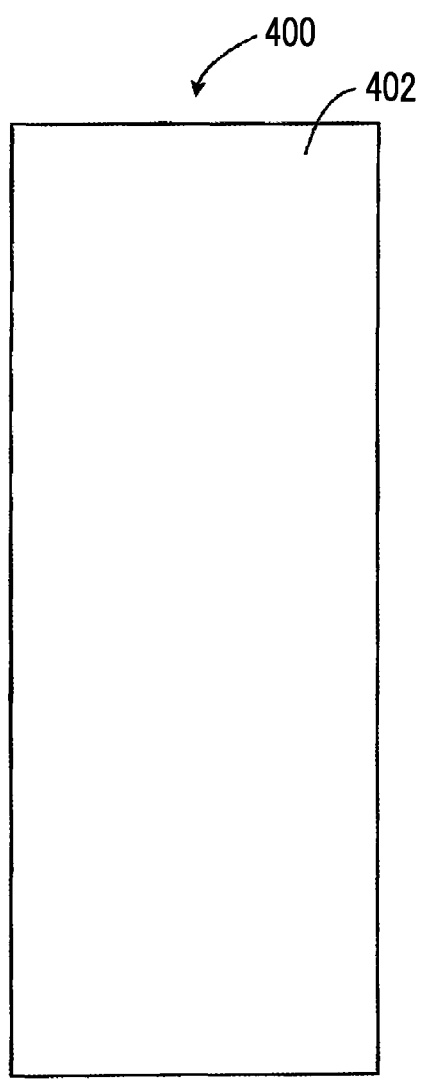

FIG. 8A
FIG. 8B
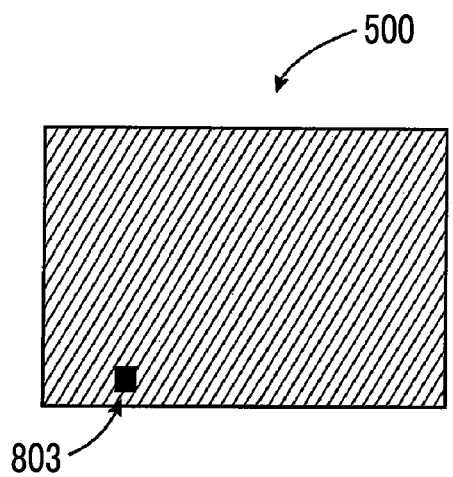
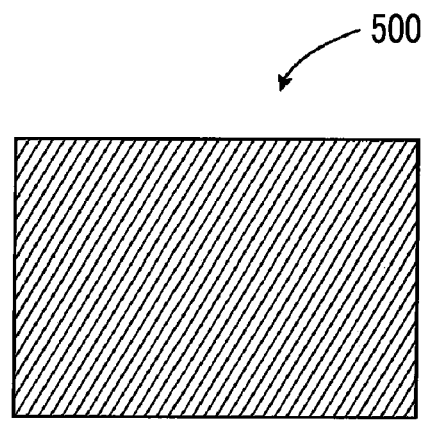

IMAGE FORMING APPARATUS FOR FORMING AN IMAGE FOR MEASURING A RELATIVE POSITION WITH RESPECT TO A PAPER

CROSS-REFERENCE TO RELATED APPLICATIONS

This application is based on and claims priority under 35 USC 119 from Japanese Patent Application No. 2020-199946 filed Dec. 2, 2020.

BACKGROUND

(i) Technical Field

The present invention relates to an image forming apparatus.

(ii) Related Art

In a case where a position of an image formed on a paper is measured with respect to the paper, it is necessary to perform measurement with reference to an end portion of the paper.

In a case where the image on the paper is scanned, a mounting table (for example, a glass stand of a flatbed scanner) is used to scan the image formed on a surface of the paper which is mounted on the mounting table to face a side of the mounting table. Here, in a case where the paper is abutted against an end portion of the mounting table to be scanned, the end portion of the paper cannot be measured well. Therefore, in a case where the position of the image is measured with respect to the paper, it is necessary to scan the image by being separated from the end portion of the mounting table, that is, in a state in which the paper is mounted at a position where a gap is provided between the end portion of the mounting table and the paper.

On the other hand, in a case where the paper is separated too far from the end portion of the mounting table, a problem occurs in that a part of the paper is separated from a scanning area on the mounting table.

In JP5974699B, a technology is proposed for adjusting a paper mounting position with respect to the mounting table by covering the paper mounted on the mounting table with a cover paper and using an alignment image formed on the cover paper and an alignment image formed on a second side that is a back side of a first side of the paper facing a side of the mounting table.

SUMMARY

In a case where the above-described proposal of JP5974699B is adopted, the paper can be mounted at a predetermined position on the mounting table. Therefore, the occurrence of the problem in that a part of the paper is separated from the scanning area on the mounting table can be suppressed.

However, the proposal is to form images on two sides of the paper and to use the alignment image on a second side in a case where an image on a first side is scanned. That is, it is necessary to form the images on two sides of the paper.

However, an image forming apparatus exists in which, in a case where an image is formed on two sides of a paper, for example, there is a limit to a length of the paper in a longitudinal direction and the image can be formed on only a single side of a long paper having a length exceeding the limit. It is necessary to measure an image position for each type of paper, and it is also necessary to measure the paper only whose single side can be formed with an image. Alternatively, a type of image forming apparatus exists which originally forms an image on only a single side of a paper.

Aspects of non-limiting embodiments of the present disclosure relate to an image forming apparatus that can guide a mounting position of a paper with respect to a mounting table even in a case of a paper on which only a single side is formed with the image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a mounting table on which an object whose image is to be scanned is mounted; an image forming section that forms an image, which includes a first image for measuring a relative position with respect to an end portion of a paper, on a first side of the paper; an image scanning section that scans the image mounted on the mounting table; and a position correction section that corrects a relative position of an image, which is formed on the paper, with respect to the paper based on a result of scanning performed by the image scanning section, in which in a case where the image scanning section scans the end portion of the paper and the image formed on the first side of the paper in a state in which the first side of the paper on which the first image is formed faces the mounting table, the end portion of the paper is mounted on the mounting table at a position separated from an end portion of the mounting table, and, further, the paper is covered with a cover paper, and the image forming section forms, on the first side of the paper, a third image that uses, as an alignment object, a second image for alignment formed on a side of the cover paper opposite to a side on which the cover paper is in contact with the paper while a part of the paper is mounted in a state of protruding from the mounting table and a first edge of the cover paper.

BRIEF DESCRIPTION OF THE DRAWINGS

Exemplary embodiment(s) of the present invention will be described in detail based on the following figures, wherein:

FIGS. 3A and 3B are a diagram showing a screen displayed on the touch panel-type display screen;

FIGS. 8A and 8B are a diagram showing a cover paper of the second example.

DETAILED DESCRIPTION

Figure 1:
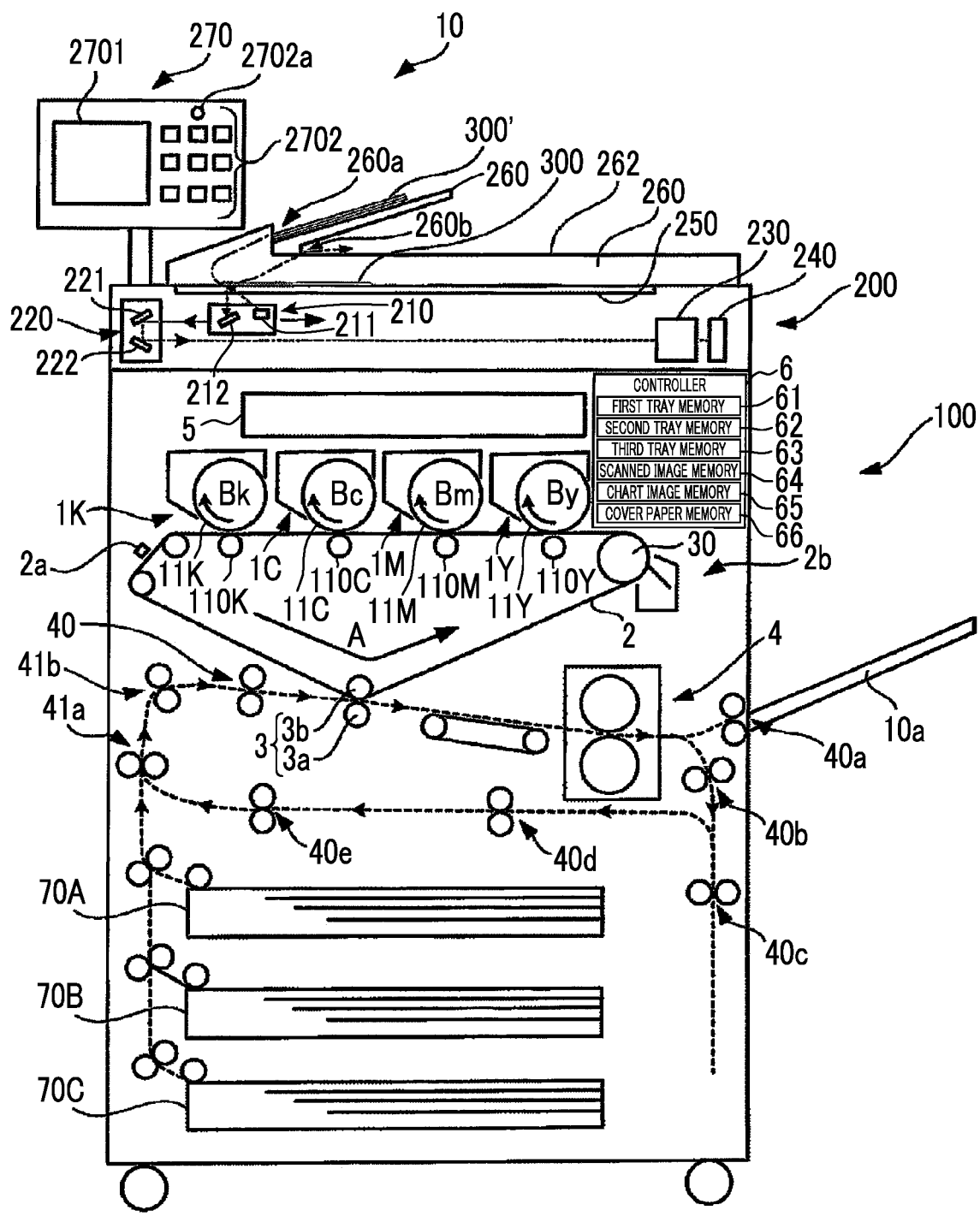
FIG. 1 is a diagram showing an overall configuration of an image forming apparatus as an exemplary embodiment of the present invention.

FIG. 1 is a diagram showing an overall configuration of an image forming apparatus as an exemplary embodiment of the present invention.

The image forming apparatus is a copy machine having a two-sided output function in addition to a single-sided output function.

An image forming apparatus 10 includes an image scanning section 200 that scans an image on a paper and generates image data representing the image, an image forming section 100 that forms the image scanned based on the image data on another paper, and an operation section 270 that receives input of various pieces of image formation information, such as designation of the number of output sheets, selection of two-sided/single-sided output, and designation of a tray for containing paper before image output, from a user.

The operation section 270 is provided with a touch panel-type display screen 2701 and a button group 2702 consisting of various buttons such as a start button for instructing start of image scanning and image formation, a numerical button for inputting a numerical value in a case of designating the number of output sheets or the like, and a button for controlling the image forming apparatus. The button group 2702 includes a correction amount calculation mode button 2702a for, in a case where an image is formed on a paper, setting a correction amount calculation mode for calculating various correction amounts, such as a correction amount for an image formation position with respect to the paper and a correction amount for a magnification of the image on the paper, in the image forming apparatus 10. The correction amount calculation will be described in detail later.

The image scanning section 200 includes an upper cover 260 that is opened and closed by the user, and a transparent glass 250 that is arranged directly below the upper cover 260. The image scanning section 200 further includes an element under the transparent glass 250 for executing image scanning on the paper.

The image scanning section 200 includes a first carriage 210, a second carriage 220, a lens unit 230, and a CCD line sensor 240 as elements for executing the image scanning. The first carriage 210 is an element that has a first mirror 212 and a lamp 211 and that can move in a horizontal direction in FIG. 1. The first carriage 210 performs a role of irradiating an image to be scanned with light by the lamp 211 and receiving reflected light. The second carriage 220 is an element that has a second mirror 221 and a third mirror 222, and that can move in the horizontal direction of the drawing as the same as the first carriage 210. The second carriage 220 and the lens unit 230 perform a role of guiding the reflected light received by the first carriage 210 to the CCD line sensor 240. Further, the CCD line sensor 240 performs a role of receiving the reflected light and generating the image data representing the image.

Here, the image scanning section 200 has a transport scanning mode and a static scanning mode as a scanning mode for scanning the image on the paper. In the transport scanning mode, paper 300 mounted on a document tray 261 is drawn from a paper feed port 260a one by one, and is transported to a discharge port 260b through a transport path indicated by a dash-dot arrow by a not-shown mechanism. The transport scanning mode is a scanning mode for scanning the image on the paper, which is being transported, using the first carriage 210 in a stationary state and sending the paper onto a paper ejection table 262. Further, the static scanning mode is a scanning mode for stopping the paper on the transparent glass 250 and scanning the paper using the first carriage 210 that moves in a direction of a solid line arrow in the drawing. In the static scanning mode, a surface of the transparent glass 250 facing a side of the upper cover 260 serves as a mounting table on which the paper 300 having the image to be scanned is mounted. Here, the paper 300 is pressed from above in a such a way that the upper cover 260 is opened, a side the paper 300 having the image to be scanned is mounted on the transparent glass 250 to face downward in FIG. 1, and the upper cover 260 is closed. In the static scanning mode, the paper 300 on the transparent glass 250 is irradiated while the first carriage 210 moves in this state, and the image on the paper 300 is scanned. When the first carriage 210 moves, the second carriage 220 also moves in the same direction at a speed which is half of the first carriage 210 so that an optical path length until the reflected light from the paper reaches the CCD sensor 240 is always kept to be identical.

The image forming section 100 includes image forming units 1K, 1C, 1M, and 1Y for forming images for respective colors of black (K), cyan (C), magenta (M), and yellow (Y), and an exposure section 5 that irradiates laser light. The image forming units 1K, 1C, 1M, and 1Y respectively include electrophotographic type-stacked image holders 11K, 11C, 11M, and 11Y which rotate in an arrow Bk direction, an arrow Bc direction, an arrow Bm direction, and an arrow By direction of FIG. 1, respectively. Here, each of the image forming units is provided with a charging device and a developing device which are not shown, in addition to the above-described image holder. The image holder in each image forming unit is charged by the not-shown charging device so that a surface potential reaches a predetermined potential, and the charged exposure section 5 performs raster scanning in a direction along a rotational axis of each of the rotating image holders 11K, 11C, 11M, and 11Y, using laser light, so that electrostatic latent image due to potential distribution is formed on the image holders. The electrostatic latent image is developed by electrostatically adhering a toner containing the charged toner in the developer to the electrostatic latent image by the not-shown developing device, and, therefore, a developed image is formed using the toner on the image holders.

Further, on a lower side of each image forming unit 1 of FIG. 1, an intermediate transfer belt 2 which is in contact with each of the image holders and moves in a direction of an arrow A of FIG. 1 is provided, and primary transfer rolls 110K, 110C, 110M, and 110Y are provided respectively at positions facing the respective image holders 11K, 11C, 11M, and 11Y while interposing the intermediate transfer belt 2. The intermediate transfer belt 2 receives transfer (primary transfer) of the developed image formed on each image holder and carries a primary transfer image.

Further, in addition to the above-described image forming units 1K, 1C, 1M, and 1Y, the intermediate transfer belt 2, and the exposure section 5, the image forming section 100 further includes a secondary transfer roll 3a for performing secondary transfer of the primary transfer image on the intermediate transfer belt 2 to the paper, and a fixing device 4 for fixing an unfixed secondary transfer image transferred onto the paper to the paper. Further, in the vicinity of the intermediate transfer belt 2, a sensor 2a is provided for detecting an inspection image of each color formed by each image forming unit and transferred onto the intermediate transfer belt 2 in a case of adjusting a relative position and magnification between the primary transfer images from the respective image holders. In the adjustment of the relative position and magnification, the sensor 2a detects the inspection image of each color transferred onto the intermediate transfer belt 2, and the image forming units 1K, 1C, 1M, and 1Y are adjusted, based on a result of the detection, so that the relative positions and magnifications between the inspection images of the respective colors become appropriate positions and magnifications.

Further, the image forming section 100 also includes three trays of a first tray 70A, a second tray 70B, and a third tray 70C for containing the paper, and a drive roll 30 for driving the intermediate transfer belt 2. The intermediate transfer belt 2 circulates in the direction of the arrow A in FIG. 1 while receiving a driving force from the drive roll 30 in a state of being stretched on the drive roll 30 or a plurality of other rolls. The intermediate transfer belt 2 is pressed against the secondary transfer roll 3a by a backup roll 3b. The primary transfer image on the intermediate transfer belt 2 is secondary transferred to the paper which is taken out from any of the first tray 70A, the second tray 70B, or the third tray 70C by action of the secondary transfer roll 3a and is transported to the secondary transfer roll 3a. The paper that has undergone the secondary transfer is further transported so that the secondary transfer image on the paper is fixed on the paper by the fixing device 4 and the paper is discharged onto the paper ejection tray 10. Here, a cleaning device 2b is provided in the vicinity of the intermediate transfer belt 2, and the toner remaining on the intermediate transfer belt 2 after the secondary transfer to the paper is removed by the cleaning device 2b. Further, the above-described inspection image of each color on the intermediate transfer belt 2, which is formed in the case of adjusting the relative position and magnification between the primary transfer images from the respective image holders is removed by the cleaning device 2b without being secondary transferred by the secondary transfer roll 3a.

The image forming apparatus 10 is provided with a controller 6 that controls each unit in the image forming section 100. The controller 6 includes a scanned image memory 64 that stores the image data generated by the CCD line sensor 240 of the image scanning section 200 described above. In addition, in the image forming apparatus 10, a deviation in an image formation position on the paper or a change in the magnification of the image occurs due to a paper transport timing, a difference in a type of paper, a difference in a transport route of paper, and the like. Therefore, as will be described in detail later, in the image forming apparatus 10, a chart image is formed on the paper, the chart image (detection image configuring the chart image) on the paper is scanned by the image scanning section 200, and various correction amounts, such as a correction amount for the image formation position with respect to the paper and a correction amount for the magnification of the image on the paper, are calculated. Therefore, in addition to the above-described scanned image memory 64, the controller 6 includes a chart image memory 65 that stores chart image data representing the chart image used for calculation of the correction amount which will be described later. The chart image memory 65 stores the chart image data for each size of the paper. Further, the controller 6 also includes a cover paper memory 66 which stores data for forming the cover paper used in a case where the chart image output on the paper is scanned. The cover paper memory 66 stores image data for the cover paper according to the size of the paper on which the chart image is formed. The cover paper will be described later. Further, here, a first tray memory 61, a second tray memory 62, and a third tray memory 63 for storing the calculated correction amount are included. The memories are memories corresponding to the above-described first tray 70A, the second tray 70B, and the third tray 70C, respectively. A reason that the memory for storing the correction amount is provided according to the tray is that a degree of the deviation in the image formation position on the paper or the change in the magnification of the image also differs according to a path through which the paper is taken out from the tray. Here, each of the trays 70A, 70B, and 70C is configured so that the size of the paper or the type of the paper to be contained is set in advance. Even in a case where power is turned on or off, previous setting is valid unless setting is reset. The present invention may have a configuration for automatically detecting the size.

In a case where the image is formed on the paper based on the image data stored in the scanned image memory 64, the controller 6 reads the correction amount from the memory corresponding to the tray designated by the operation of the user via the operation section 270, performs various correction processes, such as an image formation position correction process and an image magnification correction process, on the image data stored in the scanned image memory 64 based on the read correction amount, and causes the above-described exposure section 5 to form an electrostatic latent image based on the image data on which the correction process is performed. Here, in a case of the present exemplary embodiment, related to the first tray memory 61 and the second tray memory 62, the correction amount consists of two types of correction amounts, that is, the correction amount for a front surface in a case of image formation on the front surface in the two-sided output and the correction amount for the back surface in a case of the image formation on the back surface in the two-sided output. In the image formation performed when the two-sided output is designated, the correction process is performed on the image data representing the image of the front surface, which is a side on which the image output is performed for the first time, of the two sides of the paper based on the correction amount for the front surface, and the correction process is performed on the image data representing the image of the back surface, which is a side on which the image output is performed for the second time, based on the correction amount for the back surface. On the other hand, in the image formation when the single-sided output is designated, the correction process is performed on the image data based on the correction amount for the front surface. However, in the case of the present exemplary embodiment, the third tray 70C contains the paper (here, referred to as long paper) that is too long to form an image on two sides. Therefore, the third tray memory 63 stores only the correction amount for the front surface.

Next, a series of operations from the image scanning to the image formation on the paper in the image forming apparatus 10 will be described. Here, a case where the static scanning mode is adopted will be described as an example.

In a case where the paper is arranged by the user between the transparent glass 250 and the upper cover 260 while causing a side having the image to be scanned to face downward in FIG. 1, further, designation of the tray for containing the paper to be used for the image formation, selection of the two-sided or single-sided output, designation of the number of output sheets, and the like are performed via the operation section 270, and the start button (not shown) for instructing the start of the image scanning and the image formation is pressed in the button group 2702, light is emitted from the lamp 211 in the first carriage 210, the light emitted by the lamp is reflected on the paper 300 through the transparent glass 250, and the reflected light forms an image, by the lens unit 230, on the CCD line sensor 240 through the first mirror 212 of the first carriage 210, and the second mirror 221 and the third mirror 222 of the second carriage 220. In FIG. 1, a path of light is indicated by a dotted arrow in the image scanning section 200. The first carriage 210 moves in the direction of the solid line arrow (sub-scanning direction) in the image scanning section 200 while irradiating the light by the lamp, and, further, the second carriage 220 also moves in the same direction at the speed which is half of the first carriage 210. As a result, a whole image on the paper 300 is irradiated, and the reflected light reflected at any part of the image forms an image on the CCD line sensor 240 while uniformly holding an optical path length. In this manner, the image data based on the reflected light of the whole image is generated by the CCD line sensor 240. Each of the generated image data is sent to the controller 6 after various signal processes, such as analog to digital conversion, is performed by a not-shown processing circuit, and is stored in the scanned image memory 64 in the controller 6. Whenever the user arranges an opposite side surface of the paper 300 or a surface of a new paper having a new image on the transparent glass 250 and presses the start button, the image data is repeatedly generated and stored in the scanned image memory 64.

The controller 6 reads the correction amount from the memory corresponding to the designated tray in the first tray memory 61, the second tray memory 62, and the third tray memory 63 with respect to the image data stored in the scanned image memory 64, and performs various correction processes, such as the image formation position correction process and the image magnification correction process, on the image data stored in the scanned image memory 64 based on the read correction amount. Further, the controller 6 causes the exposure section 5 to form the electrostatic latent image based on the image data, on which the correction process is performed, on the charged image holders 11K, 11C, 11M, and 11Y. The formed electrostatic latent image is developed by a developing device in each image forming unit with the toner in the developer containing the toner of the color corresponding to each image forming unit, so that the developed image of each color is formed. The developed image of each color formed in each image forming unit in this manner is sequentially transferred (primary transfer) and superimposed on the intermediate transfer belt 2 by the action of the primary transfer rolls 110K, 110C, 110M, and 110Y corresponding to the respective image holders, so that the primary transfer image of a multicolor is formed. Further, the primary transfer image of the multicolor is carried to the secondary transfer roll 3a by the intermediate transfer belt 2. On the other hand, the paper in the tray designated among the first tray 70A, the second tray 70B, and the third tray 70C is taken out in response to the formation of the primary transfer image of the multicolor, and is transported by a pair of first transport rolls 41a and a pair of second transport rolls 41b. Further, a condition of the paper is prepared by a pair of alignment rolls 40. Further, a timing, at which the primary transfer image on the intermediate transfer belt 2 reaches the position of the secondary transfer roll 3a, is matched by the pair of alignment rolls 40 so that the paper is delivered and the paper is sent to the position. Therefore, the above-described primary transfer image of the multicolor is transferred (secondary transfer) to the delivered paper by the secondary transfer roll 3a. The paper that has undergone the secondary transfer is further transported by a transport belt 31, and a fixing process is performed by the fixing device 4 on the secondary transfer image on the paper. In FIG. 1, the paper transport path at this time is indicated by a path indicated by the dotted arrow pointing to the right in the image forming section 100. After the secondary transfer to the paper, the toner remaining on the intermediate transfer belt 2 is removed by the cleaning device 2b.

In a case where the single-sided output is selected, the paper passes through the paper transport path only once to fix the secondary transfer image in the fixing device 4, passes through the pair of delivery rolls 40a, and is discharged onto the paper ejection tray 10a as it is.

On the other hand, in a case where the two-sided output is selected, the secondary transfer image is transferred and fixed on a single side of the paper by passing through the above-described paper transport path indicated by the arrow pointing to the right, the paper passes between the pair of first two-sided transport rolls 40b without facing the pair of delivery rolls 40a, and the paper is transported downward through a path indicated by a downward dotted arrow. Thereafter, a rotation direction of a pair of second two-sided transport rolls 40c is reversed, and the paper transport direction is turned upward. The paper further passes between a pair of third two-sided transport rolls 40d and a pair of fourth two-sided transport rolls 40e through a path indicated by a dotted arrow pointing to the left, and faces the secondary transfer roll 3a again after passing through the pair of first transport rolls 41a, the pair of second transport rolls 41b, and the pair of alignment rolls 40. Here, until the paper reaches the position of the secondary transfer roll 3a again after having undergone transfer first by the secondary transfer roll 3a, the primary transfer image of a new multicolor is formed on the intermediate transfer belt 2 using the above-described method. Further, when the paper reaches the secondary transfer roll 3a for the second time, the primary transfer image of the new multicolor is secondary transferred to a second side which is a back side with respect to the first side on which the paper has undergone the secondary transfer for the first time. Further, the fixing process is performed on the new secondary transfer image on the second side by the fixing device 4, and the paper whose two sides are formed with the fixed image is discharged onto the paper ejection tray 10a. Here, after the secondary transfer to the second side of the paper, the toner remaining on the intermediate transfer belt 2 is removed by the cleaning device 2b.

When the third tray 70C is designated in a case of the image output, two-sided output cannot be designated due to the limitation of the paper transport path length for the two-sided output, and only single-sided output is possible to the first side on the paper contained in the third tray 70C.

Hereinabove, an operation of the image forming apparatus 10 has been described, and, in the image forming apparatus 10, the image formation of the image scanned in this manner is performed on the paper.

In the above description, the case where the static scanning mode is adopted has been described as an example. However, a case where the transport scanning mode is adopted is the same as the above-described image scanning and image formation except that the image on the paper being transported is scanned using the first carriage 210 in the stationary state.

In the above description, in a case where the image formation position correction is performed in the paper, the image formation position correction process is performed on the image data. However, in the present invention, the image formation position correction may be performed in the paper instead of performing the correction using the data process on the image data. For example, for the position correction of the whole image for a paper transport direction in the paper, the correction may be performed by controlling the pair of alignment rolls 40 to change a timing of delivering the paper toward the secondary transfer roll 3a. Further, for the position correction of the whole image for a direction perpendicular to the paper transport direction in the paper, the correction may be performed by changing a writing position of the electrostatic latent image on each image holder for the direction perpendicular to the paper transport direction (rotational axis direction of each image holder) by controlling the exposure section 3.

Here, in the image forming apparatus 10, the image formation is possible on a paper larger than a size that can be scanned by the image scanning section 200. Generally, a scanning range of the image scanning section 200 matches a width of the transparent glass 250 (that is, a width of the mounting table). Even in a case where the image is output to a paper that has a larger size than a width of the transparent glass 250 (that is, the width of the mounting table), for example, it is desired that the image is accurately output with a predetermined size (magnification) at a predetermined position in the paper, similar to a case where the image is output to a paper that has a smaller size than the width of the transparent glass 250.

Hereinafter, the correction amount calculation of the position and magnification of the image formed on the paper will be described.

In the image forming apparatus 10, the correction amount calculation, which will be described below, of the position and the magnification of the image is performed using the image forming unit 1K for black (K). It is possible to obtain the correction amount, which is obtained in a case where the image forming unit of each color of cyan (C), magenta (M), or yellow (Y) is used, from the correction amount calculated using the image forming unit 1K for black (K) through the above-described adjustment of the relative position and magnification between the primary transfer images formed by the respective image forming units of four colors including the image forming unit 1K for black (K).

In the image forming apparatus 10, in a case where the correction amount calculation mode button 2702a is pressed in the operation section 270 of FIG. 1, a mode for calculating the correction amount is set in the image forming apparatus 10. Here, in the image forming apparatus 10, the correction amount calculation is performed for each size of the paper, and a mode is switched to the correction amount calculation mode for each size of the paper whenever the correction amount calculation mode button 2702a is pressed. In the image forming apparatus 10, unless the correction amount calculation mode button 2702a is pressed, a normal mode for performing image scanning and image formation using the above-described method is set, and the normal mode is a default mode in a case where the power of the image forming apparatus 10 is turned on.

The image forming apparatus 10 includes a device for enabling the correction amount calculation with respect to the image formation position, an image magnification, or the like on the paper having the size larger than the width of the transparent glass 250 (the width of the mounting table). Here, two types of paper exist in the paper having the size larger than the width of the transparent glass 250. One of the types of paper is a "long paper" on which only single-sided output is possible. The other one is a paper on which two-sided output is possible but which has a size that is approximately the same as or larger than the width of the transparent glass 250 (hereinafter, the paper having the size is referred to as a "large size paper").

In a case of the present exemplary embodiment, the first tray 70A of FIG. 1 contains a paper having a size smaller than the width of the transparent glass 250 (referred to as a "normal size paper"), the second tray 70B contains the "large size" paper (for example, A3 paper) on which the two-sided output is possible, and the third tray 70C contains the "long paper" on which only single-sided output is possible. Hereinafter, first, a case where the correction amount calculation is performed using the long paper, which is contained in the third tray 70C and on which the image output is possible on only a single side, will be described.

As described above, in the image forming apparatus 10, the correction amount calculation is performed for each paper tray, that is, for each size of the paper, and a mode is switched to the correction amount calculation mode of each paper tray (size of each paper) whenever the correction amount calculation mode button 2702a is pressed. Here, in a case where the correction amount calculation mode button 2702a is pressed a predetermined number of times in the operation section 270 of FIG. 1, a mode for calculating the correction amount with respect to the image formation position on the long paper contained in the third tray 70C is set in the image forming apparatus 10.

Figure 2:
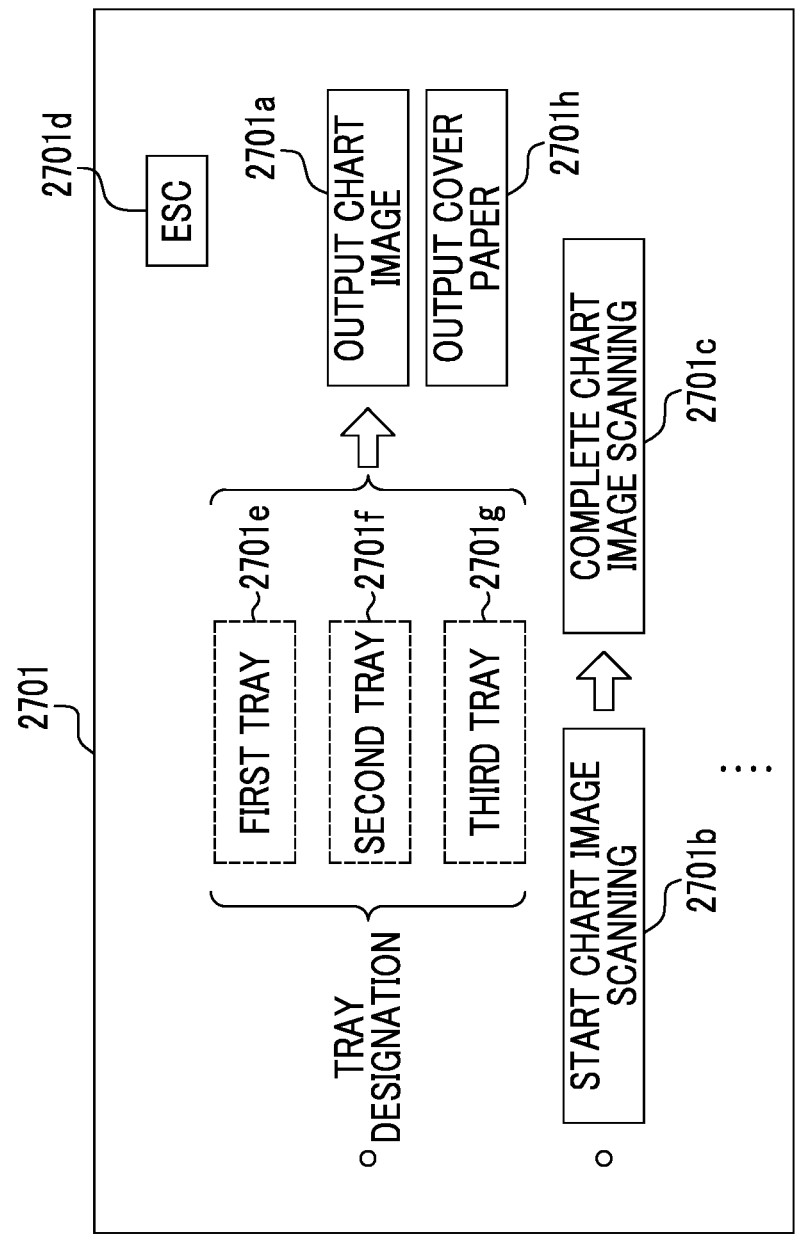
FIG. 2 is a diagram showing a screen displayed on a touch panel-type display screen.

FIG. 2 is a diagram showing a screen displayed on a touch panel-type display screen.

In a case where the mode for calculating the correction amount with respect to the image formation position on the paper, the image magnification, or the like is set, the screen shown in FIG. 2 is displayed on the touch panel-type display screen 2701 of FIG. 1. The screen displays three tray designation push buttons including a first tray designation push button 2701e, a second tray designation push button 2701f, and a third tray designation push button 2701g in order to designate the tray containing the paper on which the chart image is output, a chart image output instruction button 2701a for instructing the output of the chart image, a scanning start push button 2701b for notifying a side of the image forming apparatus 10 that the user causes the image forming apparatus 10 to scan the chart image, a scanning completion push button 2701c for notifying the side of the image forming apparatus 10 that the user has completed a work of causing the image forming apparatus 10 to scan the chart image, an ESC push button 2701d for returning from the correction amount calculation mode to the normal mode, and a cover paper output instruction button 2701h for instructing to output the cover paper, as push buttons that receive contact of a finger of the user. Here, in the mode for calculating the correction amount on the long paper, only the tray designation push button corresponding to the tray that contains the long paper can be selected, and the tray designation push button corresponding to the tray that does not contain the long paper cannot be selected. In the exemplary embodiment described here, the long paper is contained only in the third tray 70C. Here, the first tray designation push button 2701e and the second tray designation push button 2701f respectively corresponding to the first tray 70A and the second tray 70BC, which do not contain the long paper, are displayed by a dotted line. This indicates that selection is not possible even though the user is in contact with a finger.

In order to perform the correction amount calculation for the long paper, the third tray designation push button 2701g corresponding to the third tray 70C containing the long paper in FIG. 1 is pressed, and then the chart image output instruction button 2701a is pressed to execute the output of the chart image. In a case where the third tray designation push button 2701g is pressed, the correction amount stored in the third tray memory 63 of FIG. 1 is determined to be used as the correction amount used in a case of the output of the chart image. In a case where the chart image output instruction button 2701a is pressed, in the image forming section 100 of FIG. 1, the chart image data representing the chart image corresponding to the long paper contained in the third tray 70C is read from the chart image memory 65 of FIG. 1, and the correction process related to the image formation position, the image magnification, or the like is performed using the correction amount stored in the third tray memory 63 at that time. Further, the chart image is output to a first side of the long paper based on the chart image data after the correction process is performed. The image formation at this time is the same as the image formation when the above-described single-sided output is selected.

In addition, the cover paper is used in a case where the chart image is scanned. In a case where the cover paper output instruction button 2701d is pressed, the cover paper, which is used to scan the chart image formed on the long paper, is output to the paper (here, the paper contained in the second tray 70B) having a size corresponding to the long paper to which the chart image is output at this time.

FIGS. 3A and 3B are a diagram showing the long paper on which the chart image are formed. Here, FIG. 3A shows the first side of the long paper, and FIG. 3B shows a second side of the long paper.

In the image forming apparatus illustrated in the exemplary embodiment, the two-sided output is not possible on a long paper 400 due to a problem of a transport path for the two-sided output, and, as shown in FIGS. 3A and 3B, only single-sided output, in which an image is formed only on a first side 401, is possible. A second side 402 remains blank. The chart image memory 65 included in the controller 6 shown in FIG. 1 stores the chart image data corresponding to each paper having each size. Further, the third tray memory 63 corresponding to the third tray 70C which contains the long paper stores the correction amount of the image formed on the first side 401 of the long paper 400. Further, in a case where the chart image is formed on the long paper 400, the chart image data for the long paper is read among the chart image data stored in the chart image memory 65, and is printed out in the image forming section 100. A chart which is printed out is scanned by the image scanning section 200, and the correction amount, such as the image formation position or the magnification, which is stored in the third tray memory 63 is generated using the scanned chart image data. The long paper 400 shown in FIGS. 3A and 3B is a chart printed out in the image forming section 100 during the process.

The chart image which is output to the long paper 400 is configured with detection images 601 and 602 and alignment images 603 and 604.

The detection images 601 and 602 are, for example, images for detecting information, such as the image formation position, by measuring distances d1 and d2 from an end portion of the long paper 400 shown in FIGS. 3A and 3B. The image data obtained by scanning the detection images 601 and 602 is input to the scanned image memory 64 of the controller 6, and then the controller 6 measures the distance d1 and d2 or the like to detect the information such as the image formation position. Further, based on the detected information, the correction amount stored in the third tray memory 63 is generated. The detection images 601 and 602 correspond to an example of a first image referred to in the exemplary embodiment of the present invention.

Here, the detection image 601 of the detection images 601 and 602 is formed at a position near to a first end portion 400a of the long paper 400, and the other detection image 602 is formed at a position near to a second end portion 400b of the long paper 400.

Further, the alignment images 603 and 604 are images for alignment of the long paper 400 in a case where the detection images 601 and 602 are scanned. The alignment image 603 formed near to the first end portion 400a in the alignment images 603 and 604 is for alignment when the detection image 601 formed near to the first end portion 400a is scanned. Further, the alignment image 604 formed near to the second end portion 400b is for alignment when the detection image 602 formed near to the second end portion 400b is scanned.

Figure 4A:
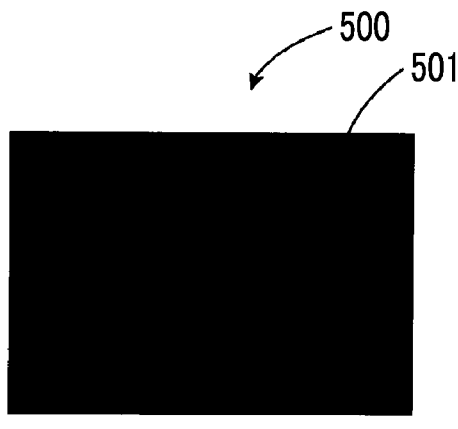
FIGS. 4A and 4B are a diagram showing a cover paper.
Figure 4B:
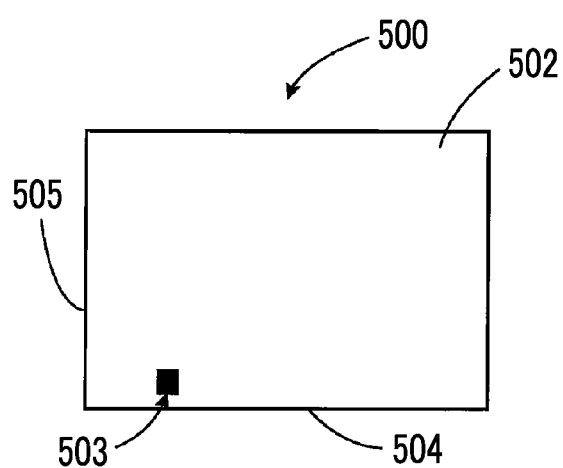

FIGS. 4A and 4B are a diagram showing the cover paper. Here, FIG. 4A shows a first side of the cover paper, and FIG. 4B shows a second side of the cover paper. The cover paper 500 is output by pressing the cover paper output button 2701h after outputting the chart image by pressing the chart image output instruction button 2701a shown in FIG. 2. The cover paper 500 output by pressing the cover paper output button 2701h is the cover paper having a size appropriate for scanning the chart image output immediately before. That is, in a case described here, the cover paper 500 is output which has a size used when scanning the detection images 601 and 602 configuring the chart image formed on the long paper 400 shown in FIGS. 4A and 4B. As described above, as the cover paper 500 in a case of scanning the detection images 601 and 602 on the long paper 400 shown in FIGS. 4A and 4B, the large size paper contained in the second tray 70B is used. The two-sided output is possible on the large size paper. Here, a uniform black image is formed on a whole surface of a first side 501 of the large size paper. A reason for this is that, in order to recognize a paper end portion of the long paper 400, which is a chart, a difference in density between a base color and background of the paper of the long paper 400 increases using the data scanned by the image scanning section 200. Further, an alignment image 503 is formed on the second side 502. The alignment image 503 is formed at a position along a first edge 504 extending in a longitudinal direction of the cover paper 500 and at a position near to an inside rather than a second edge 505 extending in a width direction. The alignment image 503 corresponds to an example of a second image referred to in the exemplary embodiment of the present invention.

The chart image is for detecting a current deviation in the position of the image on the paper, and needs to be output whenever the deviation is detected. On the other hand, in a case where the cover paper 500 is output and stored once, the cover paper 500 can be used repeatedly as many times as necessary. Therefore, the cover paper 500 may be output separately without providing the cover paper output button 2701h. Alternatively, the cover paper 500 may be prepared separately from the image forming apparatus 10 (refer to FIG. 1).

Figure 5A:
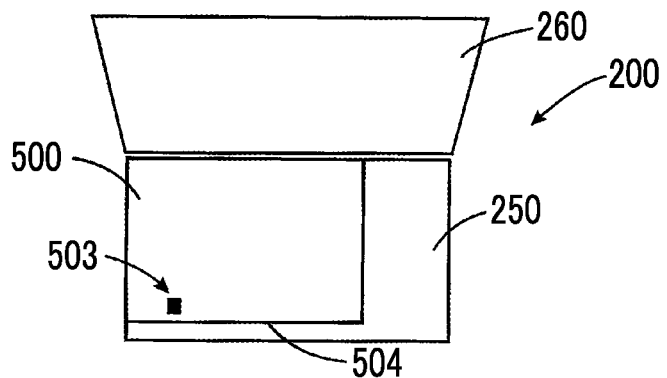
FIGS. 5A, 5B and 5C are a diagram showing an aspect of paper.
Figure 5B:
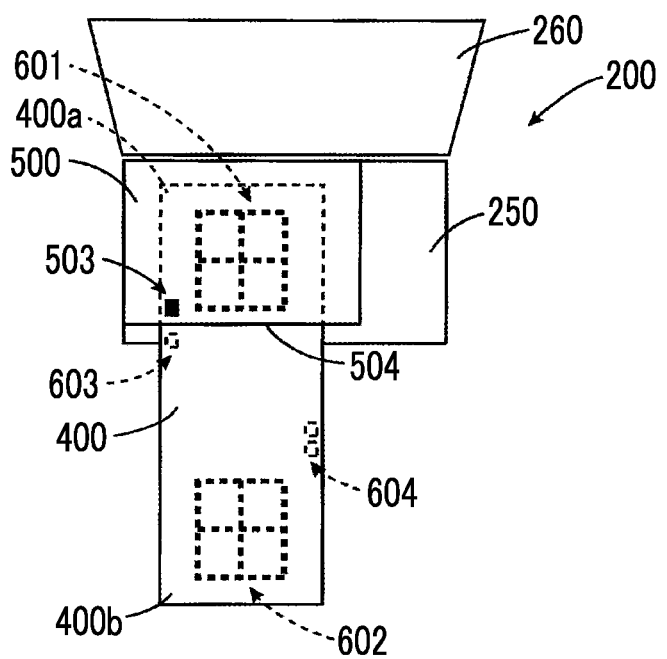
Figure 5C:
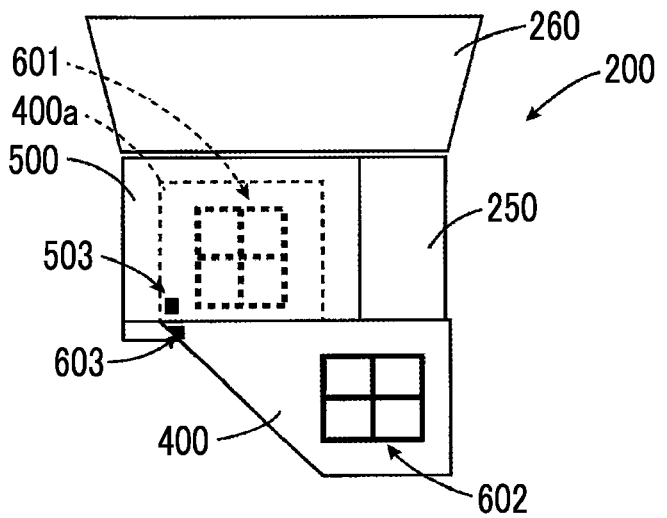

FIGS. 5A, 5B and 5C are a diagram showing a state of paper alignment in a case where the chart image is scanned.

FIGS. 5A, 5B and 5C schematically show the image scanning section 200 of the image forming apparatus 10 shown in FIG. 1.

FIG. 5A shows a state in which the cover paper 500 is mounted on the transparent glass 250 of the image scanning section 200. In a case where the cover paper 500 is mounted on the transparent glass 250, the cover paper 500 is mounted on the transparent glass 250 in a posture in which the first side 501 (refer to FIGS. 4A and 4B) faces a side of the transparent glass 250, that is, in a posture in which the first side 501 whose whole surface is black faces downward. In a case where the cover paper 500 is mounted on the transparent glass 250, an upper left corner is abutted against a frame of the transparent glass 250. As a result, a position of the cover paper 500 with respect to the transparent glass is uniquely determined. Further, in a case where the cover paper 500 is mounted on the transparent glass 250, the cover paper 500 is arranged in a posture in which the first edge 504 on a side, on which the alignment image 503 is formed, is a near side (lower side in the drawing).

Next, as shown in a part (B) in FIGS. 5A, 5B and 5C, the first end portion 400a, on which the chart image is formed, of the long paper 400 goes under the cover paper 500 while facing downward (a side of the transparent glass 250), so that the long paper 400 becomes a state of protruding from the first edge 504 of the cover paper 500. Further, as shown in a part (C) of FIGS. 5A, 5B and 5C, the position of the long paper 400 is aligned while checking the alignment image 603 by folding a part of the long paper 400 that protrudes from the first edge 504 of the cover paper 500. In the present exemplary embodiment, the alignment image 603 is, for example, an image consisting of one black rectangle. Here, the alignment image 503 drawn on the cover paper 500 and the alignment image 603 drawn on the long paper 400 are arranged at identical positions in a direction along the first edge 504 of the cover paper 500. Further, the alignment images 503 and 603 are in a state of being separated at approximately the same distance from the first edge 504 by eye while interposing the first edge 504 of the cover paper 500. In a case where the long paper 400 is arranged at the position, a part of the long paper 400 which is covered with the cover paper 500 is in a range of a scanning area while including the end portion of the paper.

Further, the long paper 400 is arranged at the position, the upper cover 260 is closed, and the image of the part of the long paper 400 covered with the cover paper 500 is scanned by the static scanning mode described above. In the image data obtained by the scanning, the end portion of the part of the long paper 400 covered with the cover paper 500 and the detection image 601 on the side of the first end portion 400a clearly appear. Based on the image data, the controller 6 shown in FIG. 1 acquires information, such as the distance d1 and d2 shown in FIGS. 3A and 3B, which is necessary to detect the position and magnification of the detection image 601 with respect to the end portion of the long paper 400.

Next, in the same manner as described above, the side of the second end portion 400b of the long paper 400 is inserted under the cover paper 500, and the detection image 602 formed on the side of the second end portion 400b is scanned. At this time, an alignment mark included the alignment image 503 of the cover paper 500 and the alignment image 604 consisting of two black rectangles on the long paper 400. As above, in a case where the alignment image 604 is an image (here, an image in which two black rectangles are arranged in the longitudinal direction of the long paper 400) different from one more alignment image 603 (here, an image consisting of one black rectangle), it is possible to easily recognize whether the image to be scanned this time is the side of the first end portion 400a or the side of the second end portion 400b. The two alignment images 603 and 604 may be images that can be distinguished from each other, and the numbers of alignment images 603 and 604 are not needed to be different. For example, the two alignment images 603 and 604 may be text such as "1" and "2", may be patterns whose shapes are different, or may be images of different colors.

Further, the detection images 601 and 602 are also set as images whose at least a part is different from each other so that it is possible to distinguish between the detection image 601 on the side of the first end portion 400a and the detection image 602 on the side of the second end portion 400b from the image data obtained by scanning.

In this manner, the distance from the end portion of the long paper 400 is detected by scanning the detection image 601 on the side of the first end portion 400a and the detection image 602 on the side of the second end portion 400b, and the controller 6 calculates how much the position, the magnification, or the like of the image formed on the long paper 400 is deviated from the predetermined position, the magnification, or the like. The "deviation" represents a "deviation" from the stored correction amount that could not be corrected using the correction amount stored in the third tray memory 63. Therefore, in the controller 6, based on information representing the "deviation", the correction amount stored in the third tray memory 63 is corrected so that the "deviation" is eliminated, and the corrected correction amount is stored in the third tray memory 63 instead of the correction amount stored so far. Thereafter, an image newly formed on the long paper adopts a new correction amount, thereby being an image having a predetermined correct position or the magnification.

Figure 6A:
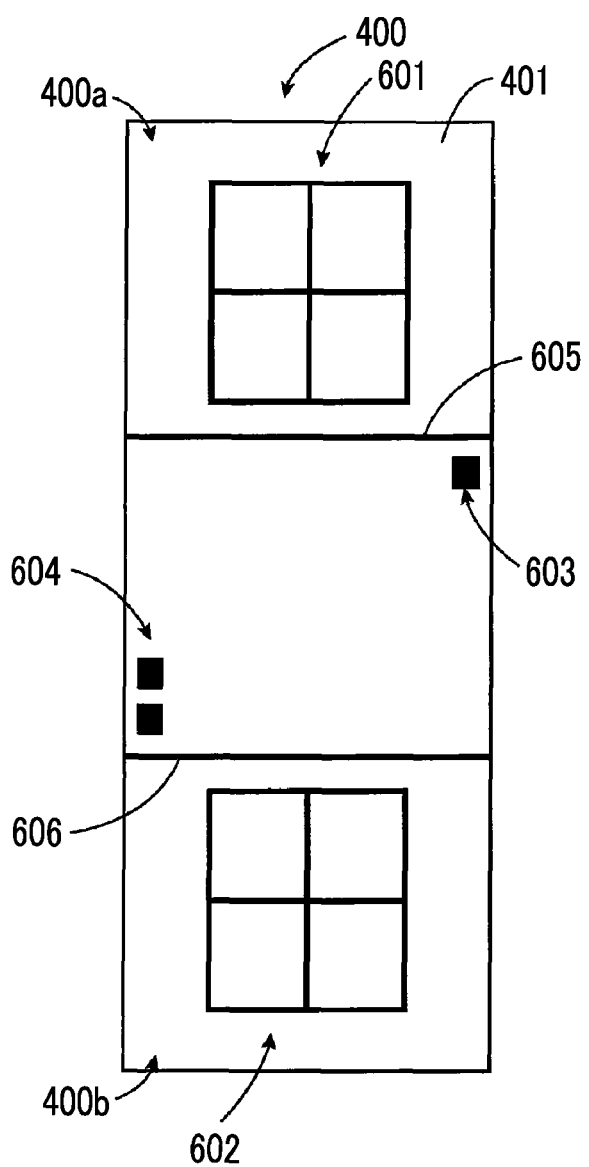
FIGS. 6A and 6B are a diagram showing a long paper on which a chart image of a second example is formed.
Figure 6B:
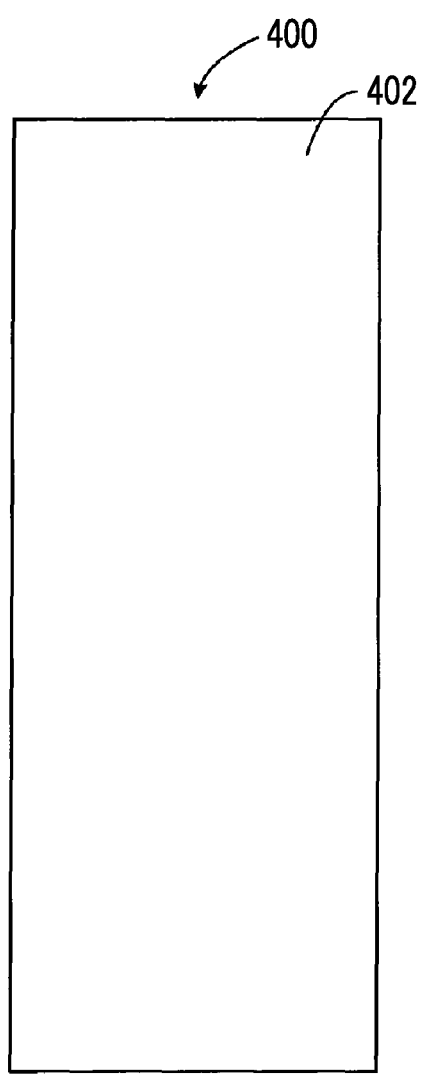

FIGS. 6A and 6B are a diagram showing a long paper on which a chart image of a second example are formed. Here, only a difference from the chart image shown in FIGS. 3A and 3B will be described.

The chart image shown in FIGS. 6A and 6B further includes two alignment images 605 and 606, in addition to the two alignment images 603 and 604. The two alignment images 605 and 606 are images consisting of line segments extending in a width direction of the long paper 400. The alignment images 605 and 606 are alignment images that serve as a standard for an appropriate insertion amount in a case where the long paper 400 is inserted under the cover paper 500. That is, when the first end portion 400a of the long paper 400 is inserted under the cover paper 500, the long paper 400 is inserted to a position at which the alignment image 605 overlaps the first edge 504 (refer to FIGS. 5A and 5B) of the cover paper 500. The presence of the alignment image 605 makes a position, to which the long paper 400 is inserted, clearer. Similar to the case of the chart image shown in FIGS. 3A and 3B, the alignment in the width direction, that is, in the direction along the first edge 504 is performed by the rectangular alignment image 503 on the cover paper 500 and the alignment image 603 on the long paper 400.

Similarly, when the second end portion 400b of the long paper 400 is inserted under the cover paper 500, the long paper 400 is inserted into a position at which the alignment image 606 overlaps the first edge 504 of the cover paper 500. The presence of the alignment image 606 makes a position, to which the long paper 400 is inserted, clearer. The alignment in the width direction, that is, in the direction along the first edge 504 is performed by the rectangular alignment image 503 on the cover paper 500 and the alignment image 604 on the long paper 400.

As shown in FIGS. 6A and 6B, instead of the alignment image which causes one of the position in the insertion direction or the position in the width direction to be visually measured, both the alignment image in the insertion direction and the alignment image in the width direction may be formed.

Figure 7A:
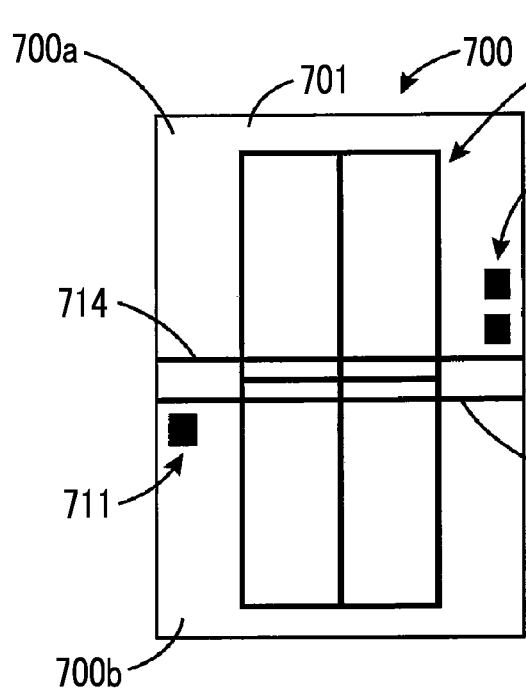
FIGS. 7A and 7B are a diagram showing a large size paper on which the chart image is formed.
Figure 7B:
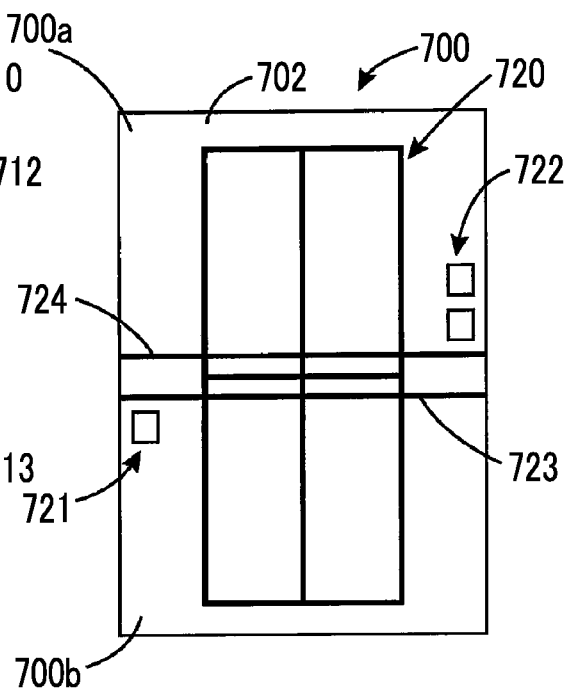

FIGS. 7A and 7B is a diagram showing a large size paper on which a chart image is formed. FIG. 7A shows a first side of the large size paper, and FIG. 7B shows a second side of the large size paper.

The chart image formed on a first side 701 of a large size paper 700 shown in FIGS. 7A and 7B includes a detection image 710 and alignment images 711, 712, 713, and 714. Similarly, the second side 702 is formed with a chart image including a detection image 720 and alignment images 721, 722, 723, and 724. The chart image of the first side and the chart image of the second side are identical images except that the alignment images 711 and 712 of the first side 701 are rectangular images painted in black and the alignment images 721 and 722 of the second side 702 are rectangular images with a black frame in order to easily distinguish the first side and the second side.

As described above, the second tray 70B of the image forming apparatus 10 shown in FIG. 1 contains the large size paper. It is possible to perform two-sided output, that is, to form an image on two sides of the large size paper. Therefore, the chart image is formed on two sides of the large size paper. In a case where the chart image is formed on the large size paper, first, a mode is set for calculating the correction amount with respect to the image formation position on the large size paper contained in the second tray 70B by pressing the correction amount calculation mode button 2702a a predetermined number of times. Then, a state is made in which it is possible to press the second tray designation push button 2701f shown in FIG. 2. Here, the second tray designation push button 2701f is pressed. Then, the chart image data for the large size paper stored in the chart image memory 65 of the controller 6 (refer to FIG. 1) is read, the chart image data is corrected by the correction amount for the first side in the second tray memory 62, and the chart image is formed on the first side based on the corrected chart image data. Similarly, the chart image data for the large size paper stored in the chart image memory 65 is corrected by the correction amount for the second side in the second tray memory 62, the alignment images 721 and 722 are changed to the rectangular images with the black frames, and the chart image is formed on the second side based on the corrected and changed chart image data.

In a case where the chart image formed on the large size paper 700 is scanned, a part of the paper 700 is inserted under the cover paper similar to the scanning of the chart image on the long paper 400. Here, the alignment images 711 and 721 of the first side 701 and the second side 702 correspond to the alignment image 603 shown in FIGS. 6A and 6B on the long paper 400, and the alignment images 712 and 722 of the first side 701 and the second side 702 correspond to the alignment image 604 shown in FIGS. 6A and 6B on the long paper 400. Further, the alignment images 713 and 723 of the first side 701 and the second side 702 correspond to the alignment image 605 shown in FIGS. 6A and 6B on the long paper 400, and the first side 701 and the second side 702 The alignment images 714 and 724 of the above correspond to the alignment images 606 shown in FIGS. 6A and 6B on the long paper 400. Duplicated description will not be repeated.

In the alignment of the large size paper 700, the alignment images 721 to 724 of the second side 702 are used for the alignment in a case where the first side 701 is scanned without turning the paper 700, and the alignment images 711 to 714 of the first side 701 are used for the alignment in a case where the second side 702 is scanned. In the case of the large size paper 700, scanning is performed four times consisting of scanning on a side of s first end portion 700a of the first side 701, scanning on a side of a second end portion 700b of the first side 701, scanning on a side of the first end portion 700a of the second side 702, and scanning on the side of the second end portion 700b of the second side 702.

FIGS. 8A and 8B is a diagram showing a cover paper of the second example.

The cover paper 500 shown in FIGS. 4A and 4B are a paper on which a uniform black image is formed on the whole surface of the first side 501 and an alignment image 503 is formed on the second side. On the other hand, in a case of a cover paper 800 of the second example shown in FIGS. 8A and 8B, only an alignment image 803 is formed on one side (first side) of the paper having a certain density. The density of the cover paper 800 is a density at a degree in which it is possible to detect the end portion of the paper with sufficient accuracy when being scanned in a manner as shown in FIGS. 5A, 5B and 5C. Further, the alignment image 803 formed on the paper 800 is an image having a density that can be clearly seen on the paper. The alignment image 803 is not limited to a color of black, and may have a density as long as a difference from a base color of the paper of the chart can be recognized. In the case of an image forming apparatus capable of using spot colors, an alignment image may be formed on a paper of a color of black using white spot colors.

The cover paper 800 of the second example can also be adopted as a cover paper in a case of scanning a chart image formed on a single side in the image forming apparatus in which only the single-sided output is possible.

According to the above exemplary embodiment, even in the case where the chart image is formed on only the single side of the paper, the paper may be correctly aligned.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a mounting table on which an object whose image is to be scanned is mounted;
   an image forming section that forms an image, which includes a first image for measuring a relative position with respect to an end portion of a paper, on a first side of the paper;
   an image scanning section that scans the image mounted on the mounting table; and
   a position correction section that corrects a relative position of an image, which is formed on the paper, with respect to the paper based on a result of scanning performed by the image scanning section, wherein
   in a case where the image scanning section scans the end portion of the paper and the image formed on the first side of the paper in a state in which the first side of the paper on which the first image is formed faces the mounting table, the end portion of the paper is mounted on the mounting table at a position separated from an end portion of the mounting table, and, further, the paper is covered with a cover paper, and the image forming section forms, on the first side of the paper, a third image that uses, as an alignment object, a second image for alignment formed on a side of the cover paper opposite to a side on which the cover paper is in contact with the paper while a part of the paper is mounted in a state of protruding from the mounting table and a first edge of the cover paper.

2. The image forming apparatus according to claim 1, wherein the image forming section forms, as the third image, both a first third image for alignment when the image scanning section scans an image formed in a region including a first end portion of the paper, and a second third image for alignment when the image scanning section scans an image formed in a region including a second end portion of the paper, on the first side of the paper.

3. The image forming apparatus according to claim 2, wherein the image forming section forms the first third image and the second third image, which are visually different from each other, on the first side of the paper.

4. The image forming apparatus according to claim 3, wherein the first third image is an image consisting of one shape arranged at a position facing the second image while interposing the first edge, and the second third image is an image consisting of two shapes arranged at positions facing the second image while interposing the first edge and arranged in a direction intersecting the first edge.

5. The image forming apparatus according to claim 1, wherein the image forming section forms, in addition to the first image and the third image, a fourth image for alignment, which is required to overlap the first edge, in a direction intersecting the first edge on the first side of the paper.

6. The image forming apparatus according to claim 2, wherein the image forming section forms, in addition to the first image and the third image, a fourth image for alignment, which is required to overlap the first edge, in a direction intersecting the first edge on the first side of the paper.

7. The image forming apparatus according to claim 3, wherein the image forming section forms, in addition to the first image and the third image, a fourth image for alignment, which is required to overlap the first edge, in a direction intersecting the first edge on the first side of the paper.

8. The image forming apparatus according to claim 4, wherein the image forming section forms, in addition to the first image and the third image, a fourth image for alignment, which is required to overlap the first edge, in a direction intersecting the first edge on the first side of the paper.

9. The image forming apparatus according to claim 5, wherein the image forming section forms, as the fourth image, both a first fourth image for alignment in the direction intersecting the first edge when the image scanning section scans an image formed in a region including a first end portion of the paper, and a second fourth image for alignment when the image scanning section scans an image formed in a region including a second end portion of the paper, on the first side of the paper.

10. The image forming apparatus according to claim 6, wherein the image forming section forms, as the fourth image, both a first fourth image for alignment in the direction intersecting the first edge when the image scanning section scans an image formed in a region including a first end portion of the paper, and a second fourth image for alignment when the image scanning section scans an image formed in a region including a second end portion of the paper, on the first side of the paper.

11. The image forming apparatus according to claim 7, wherein the image forming section forms, as the fourth image, both a first fourth image for alignment in the direction intersecting the first edge when the image scanning section scans an image formed in a region including a first end portion of the paper, and a second fourth image for alignment when the image scanning section scans an image formed in a region including a second end portion of the paper, on the first side of the paper.

12. The image forming apparatus according to claim 8, wherein the image forming section forms, as the fourth image, both a first fourth image for alignment in the direction intersecting the first edge when the image scanning section scans an image formed in a region including a first end portion of the paper, and a second fourth image for alignment when the image scanning section scans an image formed in a region including a second end portion of the paper, on the first side of the paper.

13. The image forming apparatus according to claim 1, wherein the image forming section forms, on a second paper different from a first paper on which an image including the first image is to be formed, an image for using the second paper as the cover paper.

14. The image forming apparatus according to claim 2, wherein the image forming section forms, on a second paper different from a first paper on which an image including the first image is to be formed, an image for using the second paper as the cover paper.

15. The image forming apparatus according to claim 3, wherein the image forming section forms, on a second paper different from a first paper on which an image including the first image is to be formed, an image for using the second paper as the cover paper.

16. The image forming apparatus according to claim 4, wherein the image forming section forms, on a second paper different from a first paper on which an image including the first image is to be formed, an image for using the second paper as the cover paper.

17. The image forming apparatus according to claim 5, wherein the image forming section forms, on a second paper different from a first paper on which an image including the first image is to be formed, an image for using the second paper as the cover paper.

18. The image forming apparatus according to claim 6, wherein the image forming section forms, on a second paper different from a first paper on which an image including the first image is to be formed, an image for using the second paper as the cover paper.

19. The image forming apparatus according to claim 13, wherein
the image forming section forms an image of a color that is distinguished from a color of the first paper at a part of a first side of the second paper which overlaps an end portion of the first paper when covering the first paper, and forms the second image on a second side of the second paper.

20. The image forming apparatus according to claim 13, wherein
the image forming section forms the second image of a color distinguished from a color of the second paper, on the second paper of a color distinguished from the color of the first paper.

* * * * *